(12) United States Patent
Yamazoe et al.

(10) Patent No.: US 7,158,671 B2
(45) Date of Patent: Jan. 2, 2007

(54) IMAGE PROCESSING APPARATUS AND METHOD

(75) Inventors: Manabu Yamazoe, Tokyo (JP); Yuji Akiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 855 days.

(21) Appl. No.: 10/391,579

(22) Filed: Mar. 20, 2003

(65) Prior Publication Data

US 2003/0179926 A1 Sep. 25, 2003

(30) Foreign Application Priority Data

Mar. 20, 2002 (JP) ............................. 2002-078924

(51) Int. Cl.
*G06K 9/00* (2006.01)

(52) U.S. Cl. ..................... 382/167; 382/162; 382/168

(58) Field of Classification Search ................ 382/162, 382/167, 168, 274; 358/1.9, 518, 522, 520, 358/521; 348/587, 592
See application file for complete search history.

(56) References Cited

U.S. PATENT DOCUMENTS

| | | | | |
|---|---|---|---|---|
| 5,249,039 A | * | 9/1993 | Chaplin | 348/587 |
| 5,715,377 A | * | 2/1998 | Fukushima et al. | 358/1.9 |
| 5,940,530 A | * | 8/1999 | Fukushima et al. | 382/164 |
| 6,628,830 B1 | * | 9/2003 | Yamazoe et al. | 382/168 |
| 6,665,434 B1 | * | 12/2003 | Yamaguchi | 382/162 |
| 2001/0007599 A1 | | 7/2001 | Iguchi et al. | 382/274 |
| 2001/0013953 A1 | | 8/2001 | Uekusa et al. | 358/444 |

FOREIGN PATENT DOCUMENTS

| | | |
|---|---|---|
| EP | 0 967 791 A2 | 12/1999 |
| EP | 0 967 791 A3 | 1/2001 |
| JP | 2000-013626 | 4/2000 |

* cited by examiner

*Primary Examiner*—Anh Hong Do
(74) *Attorney, Agent, or Firm*—Fitzpatrick, Cella, Harper & Scinto

(57) ABSTRACT

The color reproduction performance of image input/output devices has been improved greatly and even very slight changes in color ascribable to a color balance correction are recognizable. As a consequence, there are cases where a specific color shift, such as a color shift in the yellow or blue direction, gives a disagreeable sensation when applied with regard to a slight color change in the color of the human skin, which is a memory color. Accordingly, highlight and shadow points are detected based upon the histogram of an image, color information of the highlight and shadow points is revised by adjusting average color difference information based upon a hue angle acquired from average color difference information of image data having luminance levels of the highlight and shadow points, and the image is corrected based upon the revised color information of the highlight and shadow points.

13 Claims, 7 Drawing Sheets

IMAGE PROCESSING APPARATUS AND METHOD

FIELD OF THE INVENTION

This invention relates to an image processing apparatus and method and, more particularly, to color correction of an image.

BACKGROUND OF THE INVENTION

Digital image input devices such as digital still cameras and scanners have become very popular in recent years, and image output devices typified by ink-jet printers also have been improved in resolution and lowered in cost. This has led to an environment in which a user can print images at home. Meanwhile, many techniques relating to image correction have been proposed and improved.

Many image correction methods rely upon a fundamental concept that involves what method to use to correct highlight and shadow points of an image. That is, there is an approach that corrects an image upon judging the direction of a color balance correction from a highlight point or shadow point. Furthermore, since a color balance correction from a warm color system of a specific scene typified by the sky at sunset to a cool color system falls within an undesirable correction, the scene is evaluated based upon various parameters and the correction is not applied to an image of such a scene.

The color reproduction performance of image input/output devices has been improved greatly and now even very slight changes in color ascribable to a color balance correction are recognizable. As a consequence, there are cases where a specific color shift, such as a color shift in the yellow or blue direction, gives a disagreeable sensation when applied with regard to a slight color change in the color of the human skin, which is a memory color. Further, from the viewpoint of desirability, it is important that a color balance correction especially from a warm to a cool color system be suppressed in an image that has undergone exception processing based upon the above-described scene evaluation.

SUMMARY OF THE INVENTION

Accordingly, the present invention seeks to solve the foregoing problems individually and collectively and its object is to enable suppression of a correction in a specific color direction.

According to a preferred embodiment of the present invention, the foregoing object is attained by providing an image processing method comprising the steps of: detecting highlight and shadow points based upon a histogram of an image; acquiring a hue angle from average color difference information of image data having luminance levels of the highlight and shadow points; revising color information of the highlight and shadow points by adjusting the average color difference information based upon the hue angle; and correcting the image based upon the revised color information of the highlight and shadow points.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Image processing according to a preferred embodiment of the present invention will be described in detail below with reference to the drawings.

The image processing described below is executed by supplying an image processing program to a computer such as a personal computer of the kind illustrated in FIG. 7. Conceivable examples of the software of this image processing program are driver software receiving an image from an image input device or the like, image editing software for editing an image or driver software such as a so-called printer driver for outputting an image to an image output device or the like.

Figure 7:
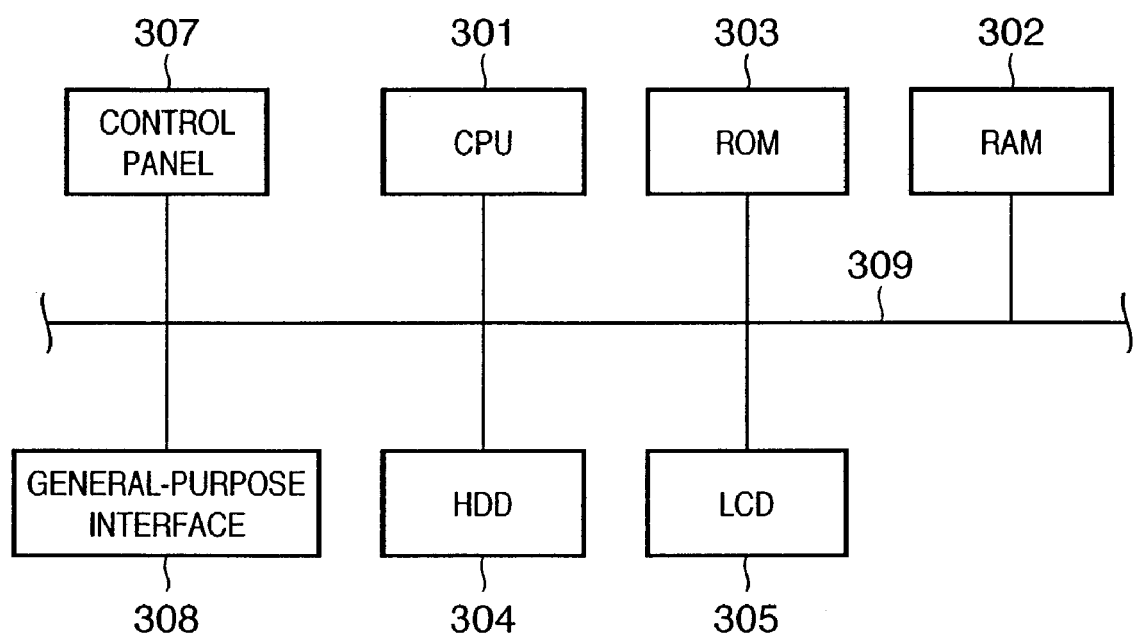
FIG. 7 is a block diagram illustrating an example of the structure of an image processing apparatus.

FIG. 7 is a block diagram illustrating an image processing apparatus according to an embodiment of the present invention. This apparatus is implemented by supplying a general-purpose personal computer with image processing software.

The CPU 301 uses a RAM 302 as a work memory, executes various programs such as a operating system and application software stored in a ROM 303 or hard-disk drive (HDD) 304 and control the apparatus components, which are connected to a system bus 309. The image processing described below also is executed by the CPU 301.

A liquid crystal display (LCD) 305 is a monitor for displaying the status of various processing and results of processing inclusive of a user interface screen, input images and output images. A control panel 307, which includes, e.g., a keyboard and a pointing device such as a mouse, allows the user to input commands and data to the image processing apparatus. A general-purpose interface 308 is a serial bus such as an USB (Universal Serial Bus) or IEEE 1394, a parallel interface such as an SCSI, GPIB, IEEE 1284 or PC card bus, or a serial interface such as an RS232C or RS422 (or a combination of a plurality of these). The general-purpose interface 308 is capable of connecting an input device such as an image scanner, a film scanner, a digital camera or a video camera, and an output device such as a printer.

Though not shown in the drawings, interfaces are present between the hard-disk drive 304 and system bus 309, the LCD 305 and system bus 309, and the control panel 307 and system bus 309.

Execution of the image processing set forth below is not limited to a computer; the processing can be executed in an image input device or image output device. If an image input device such as a digital camera and an image output device such as an ink-jet printer are connected directly and an image captured by the digital camera is printed, the image processing described below would be executed by the image input device or image output device.

<First Embodiment>

Figure 1:
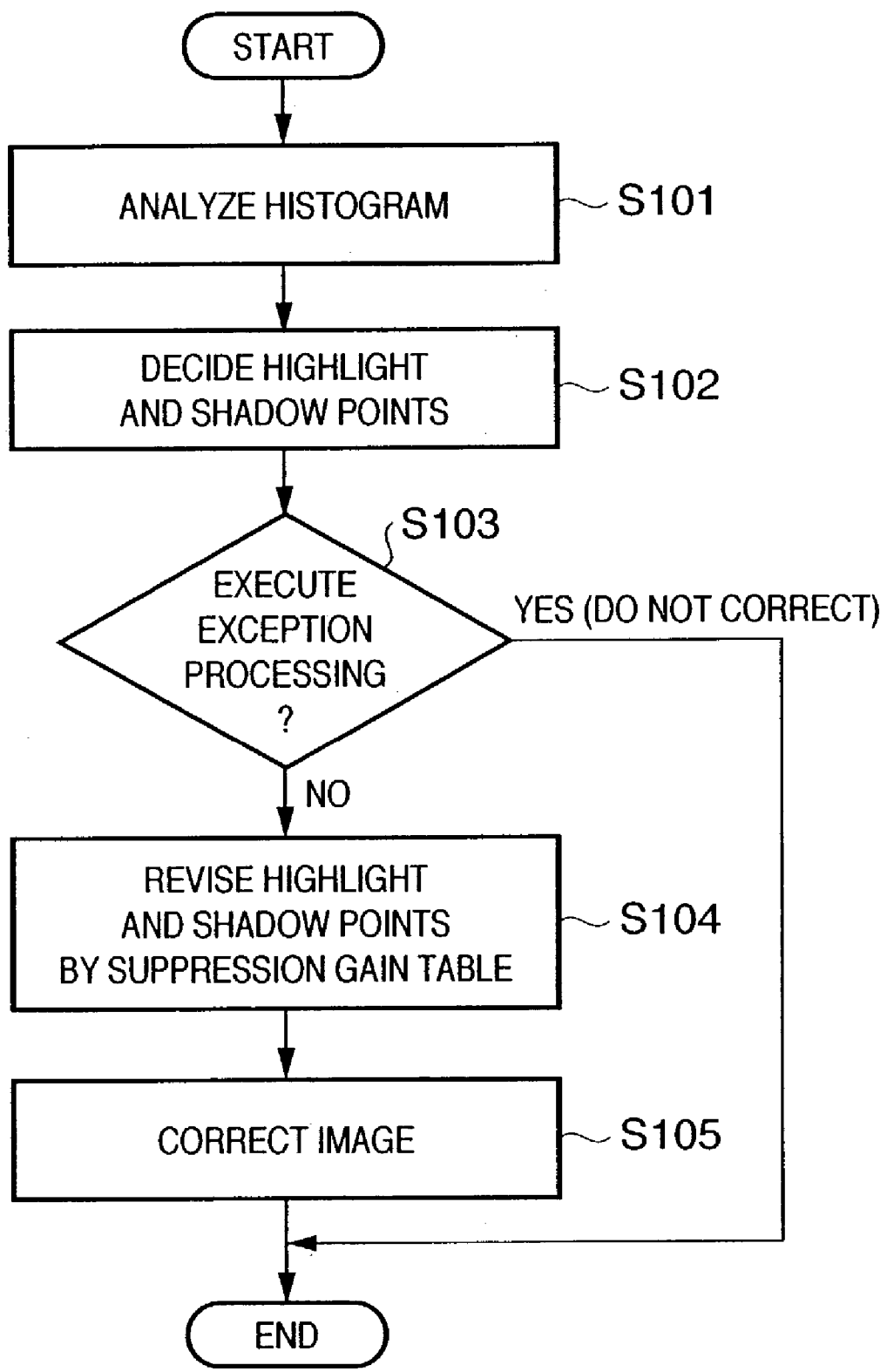
FIG. 1 is a flowchart illustrating an example of image correction processing according to a first embodiment of the present invention.

FIG. 1 is a flowchart illustrating an example of image correction processing according to this embodiment.

Image correction according to this embodiment involves analyzing a histogram of an original image (S101), deciding a highlight point (a point that should be white) and a shadow point (a point that should be black) based upon result of analysis (S101) and then correcting the image.

Figure 2:
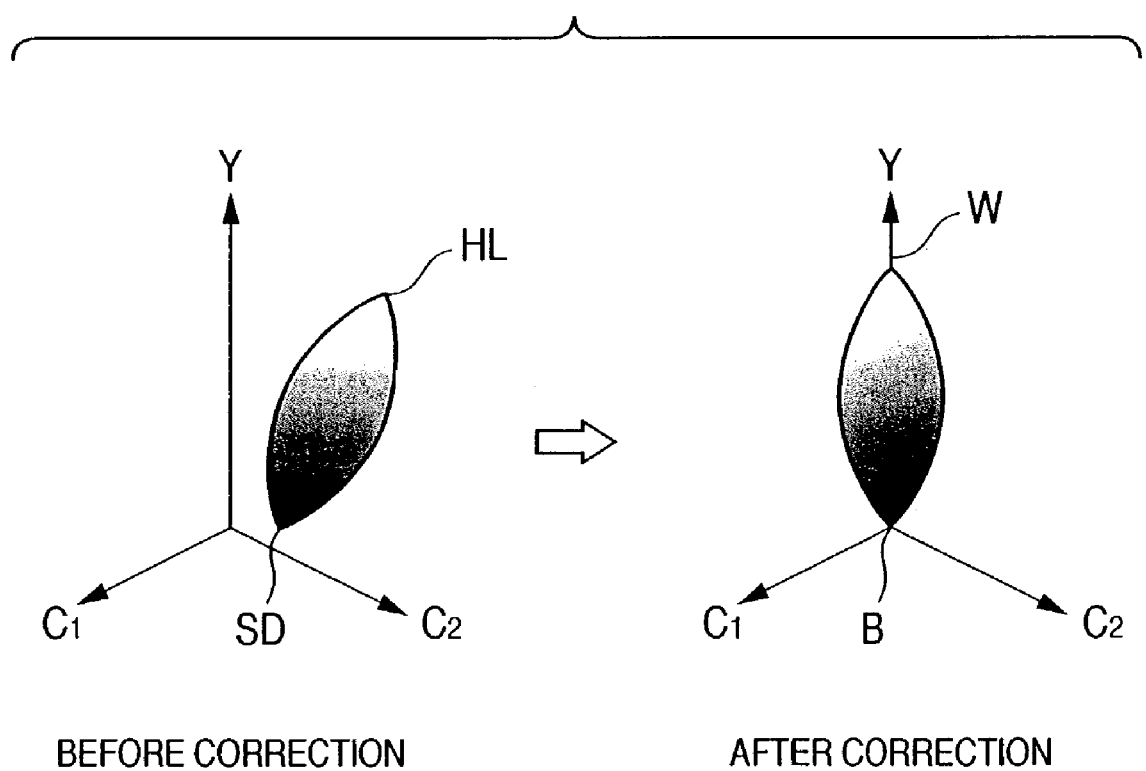
FIG. 2 is a diagram schematically illustrating the concept of a color correction.

The Inventors have disclosed a method of performing an image correction based upon highlight and shadow points (see the specification of Japanese Patent Application Laid-Open No. 2000-13626). The concept of the correction disclosed in the above specification is to convert the RGB signal of an original image to a luminance signal Y and two color difference signals C1, C2, decide a highlight point $(Y_{HL}, C1_{HL}, C2_{HL})$ and shadow point $(Y_{SD}, C1_{SD}, C2_{SD})$ from a histogram function relating to the luminance signal, and perform a color correction in YCC color space (a color space comprising luminance and color difference) in such a manner that these points become white and black, respectively. FIG. 2 is a diagram schematically illustrating the concept of this color correction. Here a color solid is mapped in such a manner that a highlight point HL and shadow point SD of the color solid before correction will be situated at white W and black B, respectively.

In accordance with the correction method shown in FIG. 2, a correction of color balance is carried out by a color difference signal between the highlight and shadow points. That is, color fogging of the overall image is corrected by causing the axis from the shadow point to the highlight point to agree with the luminance axis Y.

More generally, this may be considered as performing a conversion of the RGB signal of an image to luminance Y and two color difference signals C1, C2, defining a color mapping (F) within YCC color space and carrying out a color correction based upon the color conversion and mapping. More specifically, a color correction is performed by Equation (1) below, and image correction is performed upon effecting a restoration to RGB.

$$(Y',C1',C2')=F(Y,C1,C2) \quad (1)$$

It will readily be understood that the results of the correction by the above-described image correction method all depend upon the highlight point and shadow point obtained. Accordingly, in a case where the highlight point is a color in a warm color system, a correction is made to a cool color system, which is the color correction direction.

Accordingly, it is so arranged that an image such as a so-called "sunset scene") that should not undergo a color fogging correction is not subjected to this correction. This is achieved by a decision (S103) regarding exception processing, which executes a scene-related decision, utilizing the highlight point and various parameters. On the other hand, an image that has not been excluded by the exception processing decision (S103), namely an image for which correction has been decided, is subjected to the image correction indiscriminately in accordance with the highlight and shadow points obtained.

Great progress has been made in terms of the color reproducibility of digital cameras and ink-jet printers, and tone reproduction on a par with silver-salt emulsion photographs is now possible with prints made at home using a combination of these image input and output devices. In other words, minute changes in color become much more conspicuous even with printing at home and this has made it necessary to suppress a color shift correction such as a color shift in a specific color direction, e.g., a correction that shifts color from the flesh tone of human skin in the direction of the color yellow.

In this embodiment, therefore, the hues H of a highlight point and shadow point obtained by analysis are found, and if the color direction is one for which a correction is desired to be suppressed, then the highlight and shadow points are revised (S104) by applying a suppression gain to each of the color difference signals.

Figure 3:
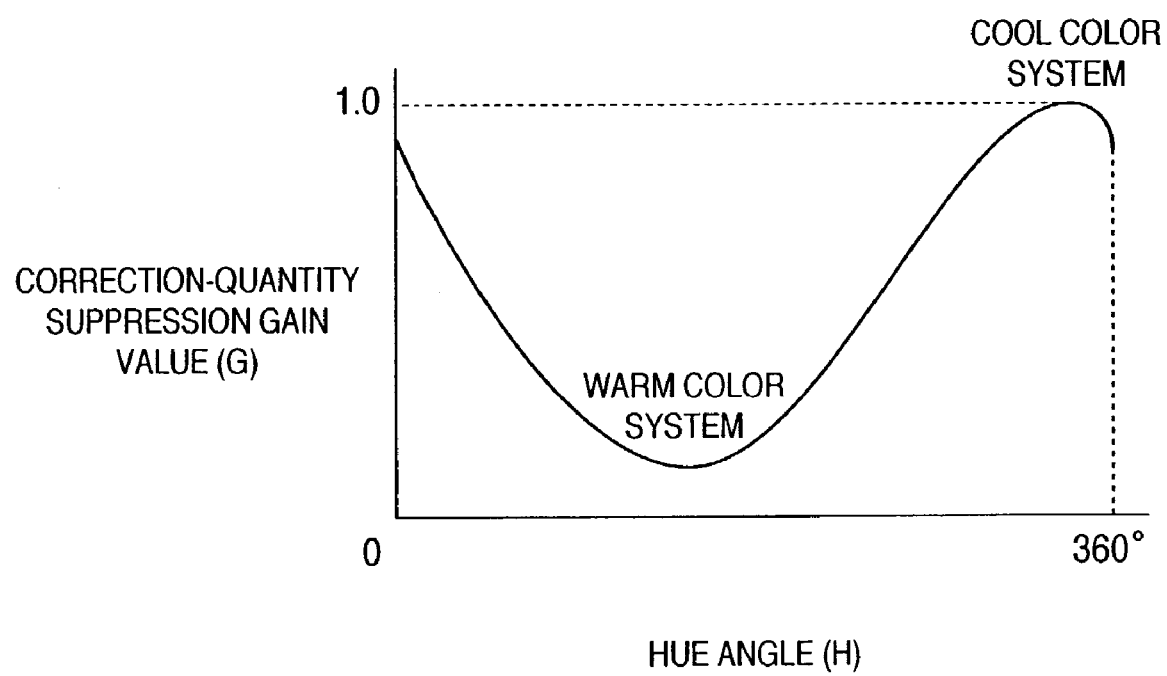
FIG. 3 is a graph useful in describing a gain value for suppressing a correction quantity.

A suppression gain value G ($0 \leq G \leq 1$) of a correction quantity related to hue H is set in advance. For example, as shown in FIG. 3, the suppression gain value G is decided so as to reduce the correction quantity in a case where hue H is in a warm color system and enlarge the correction quantity in a case where hue H is in a cool color system. Suppression gain values $G(H_{HL})$ and $G(H_{SD})$ versus a hue angle $H_{HL}$ of the highlight point and a hue angle $H_{SD}$ of the shadow point, respectively, are found. It should be noted that a suppression gain function relating to hue H may be decided in advance and the suppression gain value G may be calculated based upon this function, or the suppression gain value G corresponding to the hue H may be obtained by referring to a table in which a correction gain function created beforehand is represented in discrete form.

A case in which the suppression gain value G is obtained by referring to a table will be described below. Specifically, in this embodiment, as shown in FIG. 3, a reference table is created beforehand in such a manner that the suppression gain value G of the correction quantity will be small in case of hue H in the warm color system, and in such a manner that a suppression gain value G close to 1.0 will be obtained so as to apply a correction close to that of the conventional correction in case of hue H in the cool color system. At step S104, therefore, the highlight and shadow points are revised as indicated by Equations (2) below.

$$C1_{HL}'=G(H_{HL}) \times C1_{HL}$$

$$C2_{HL}'=G(H_{HL}) \times C2_{HL}$$

$$C1_{SD}'=G(H_{SD}) \times C1_{SD}$$

$$C2_{SD}'=G(H_{SD}) \times C2_{SD} \quad (2)$$

The image is corrected (S105) by the above-described method based upon the highlight and shadow points thus revised.

Thus, by revising the color difference information of the highlight and shadow points based upon the hue H thereof, it is possible to apply a more appropriate image correction even to an image that has undergone the exception processing decision (S103). In other words, it is possible to suppress a color shift correction in a specific color direction, such as a color shift from the flesh tone of human skin toward the color yellow.

<Second Embodiment>

Image processing according to a second embodiment of the invention will now be described. Components and processing steps similar to those of the first embodiment are designated by like reference characters and need not be described in detail again.

In the method described in the first embodiment, a correction quantity is suppressed by revising the color difference information of the highlight and shadow points themselves. In the second embodiment, however, a method will be described in which suppression gain conforming to luminance is applied to a color correction revision quantity (amount of movement) based upon mapping F.

Figure 4:
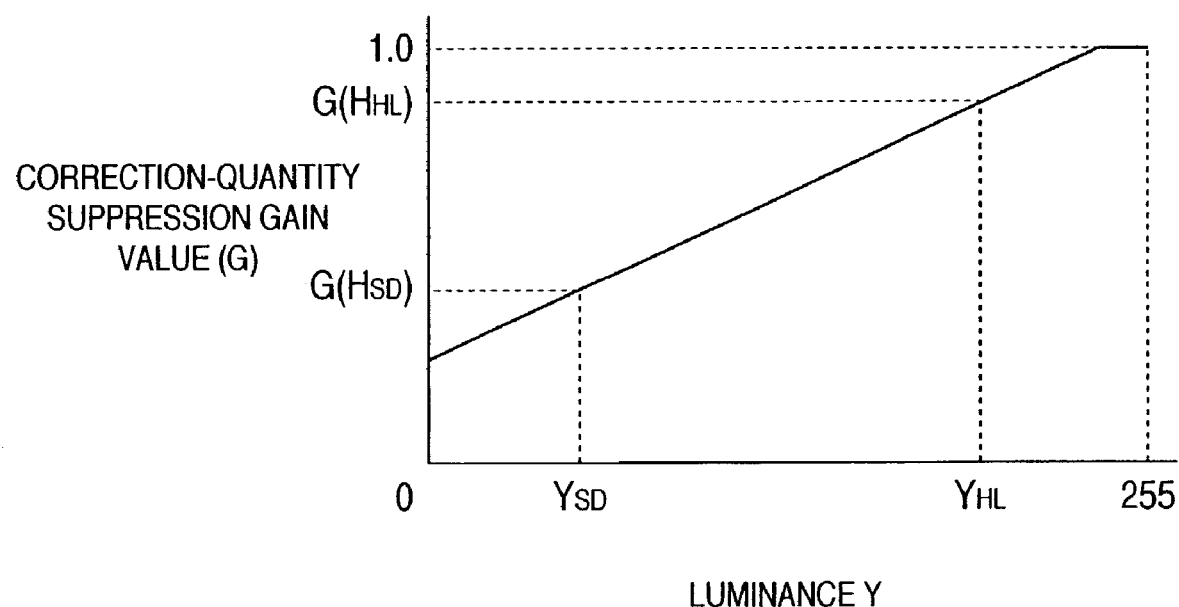
FIG. 4 is a graph useful in describing a plot of correction-quantity suppression gain value vs. luminance.

A suppression gain value G conforming to luminance level is set based upon a suppression gain value G (see FIG. 2) corresponding to each hue angle H of the highlight and shadow points. Suppression gain value G conforming to luminance Y is defined as a linear function that is based upon, e.g., a suppression gain value $G(H_{SD})$ of shadow point $Y_{SD}$ and a suppression gain value $G(H_{HL})$ of shadow point $Y_{HL}$ a, as depicted in FIG. 4. In a case where the suppression gain value G is less than 0 or greater than 1.0, however, a clipped value, namely 0 or 1.0, is defined as the suppression gain value G.

By thus setting the suppression gain value, the correction quantity of image data having a luminance corresponding to highlight point HL and shadow point SD can be suppressed to the desired correction quantity.

The above-described suppression gain value G is applied to amount of movement when a color conversion is made based upon the mapping F of color correction. That is, a revised luminance signal Y" and color difference signals C1", C2" are obtained by Equations (3) from the signal values Y, C1, C2 and Y', C1', C2', which are obtained from Equations (1).

$$Y''=G(Y)\times(Y'-Y)+Y$$

$$C1'=G(Y)\times(C1'-C1)+C1$$

$$C2''=G(Y)\times(C2'-C2)+C2 \quad (3)$$

Figure 5:
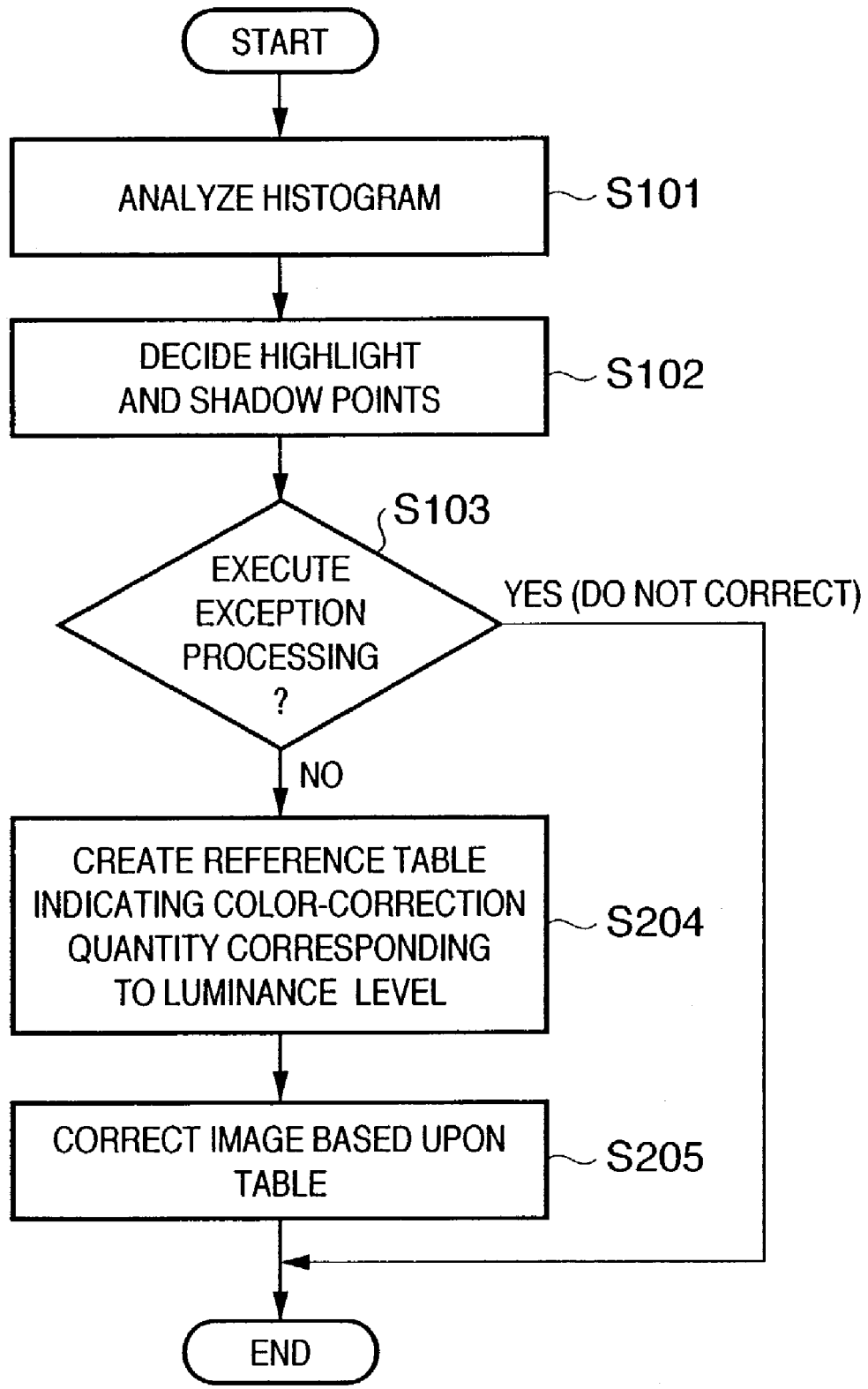
FIG. 5 is a flowchart illustrating an example of image correction processing according to a second embodiment of the present invention.

FIG. 5 is a flowchart illustrating an example of image correction processing according to the second embodiment. Here a reference table regarding the suppression gain value G corresponding to Equations (3) is created at step S204, and the image is corrected based upon this reference table.

<Third Embodiment>

Image processing according to a third embodiment of the invention will now be described. Components and processing steps similar to those of the first and second embodiments are designated by like reference characters and need not be described in detail again.

In the method described in the second embodiment, a correction-quantity suppression gain value G conforming to luminance Y is set based upon the highlight and shadow points. In the third embodiment, focus is centered on the direction of the slope of the axis (referred to as the "luminance axis") connecting the shadow and highlight points. That is, the focus is on hue.

As will readily be understood from FIG. 2, revision of the highlight and shadow points is a correction relating to white and black, and the result of the correction is very recognizable. On the other hand, the luminance axis indicates the direction and degree of color shift of the overall image, and correcting the color balance of the image is equivalent to erecting the luminance axis. That is, the hue angle (slope) of the luminance axis indicates the correction direction of the image color balance.

Figure 6:
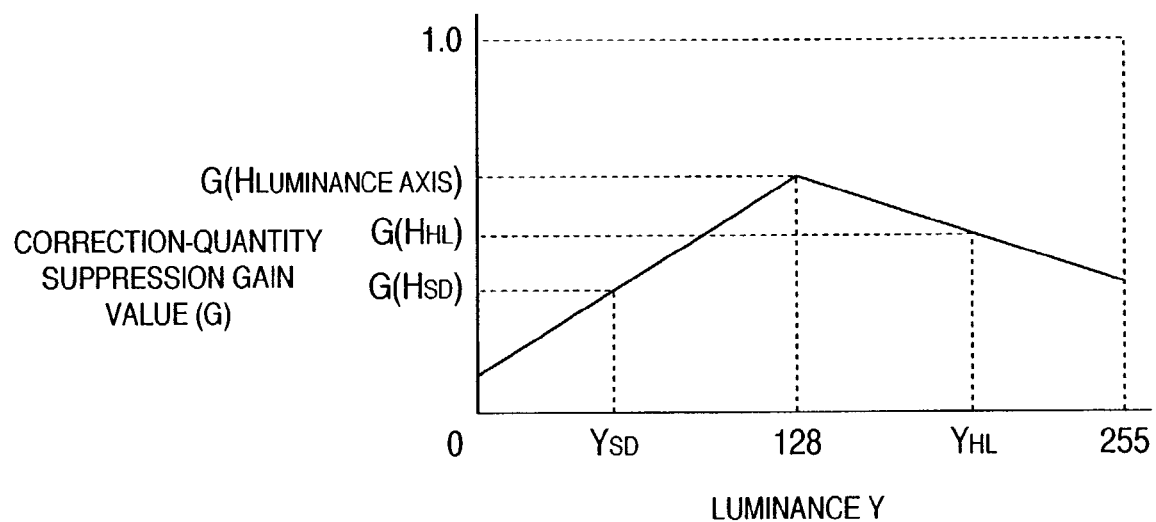
FIG. 6 is a graph useful in describing a plot of correction-quantity suppression gain value vs. luminance that takes halftones into consideration.

When an image is corrected, there are cases where it is desired to correct color fogging not only of white and black but also color fogging relating to halftones. This embodiment takes such a case into consideration and, as shown in FIG. 6, obtains a correction-quantity suppression gain value G versus a luminance value 128 of a halftone from the hue angle of the luminance axis, and sets a function of the correction-quantity suppression gain value versus luminance Y. In a manner similar to that of the second embodiment, the revised luminance signal Y" and color difference signals C1", C2" are found from Equations (3) and the image is corrected as described above.

An example in which the luminance value 128 is utilized as a representative halftone has been described. However, instead of the luminance value 128, it is permissible to utilize a luminance value, which is obtained by histogram analysis, corresponding to an intermediate value or average value.

Thus, by adopting a suppression gain value that suppresses the amount of correction of halftones separate from suppression of the amount of correction of highlight and shadow points in which results of correction appear conspicuously, it is possible to apply a color fogging correction of halftones independently of highlight and shadow areas.

Modification of Embodiments

An example in which a correction is performed in YCC color space has been described. However, the correction may be performed in another color space, such as L*a*b* color space.

According to each of the embodiments described above, correction in a specific color direction can be tuned with ease while use is made of the conventional color correction techniques. That is, with regard to correction of the color of skin, which is one of the memory colors, a correction in the direction of yellow or in the direction of blue in a cool color system can be suppressed with ease. Moreover, color fogging in a cool color system, such as blue fogging, can be corrected effectively in a manner similar to that of the prior art.

<Other Embodiment>

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing method comprising the steps of:
detecting highlight and shadow points based upon a histogram of an image;
acquiring a hue angle from average color difference information of image data having luminance levels of the highlight and shadow points;
revising color information of the highlight and shadow points by adjusting the average color difference information based upon the hue angle; and
correcting the image based upon the revised color information of the highlight and shadow points.

2. The method according to claim 1, wherein the adjustment of the average color difference information is performed in a direction that suppresses the correction in relation to the hue of a warm color system.

3. The method according to claim 1, wherein the adjustment of the average color difference information is performed by referring to a table, which has been set in advance, indicating suppression values corresponding to discrete hue angles.

4. An image processing method comprising the steps of:
detecting highlight and shadow points based upon a histogram of an image;
acquiring a hue angle from average color difference information of image data having luminance levels of the highlight and shadow points;
setting a color-correction suppression value, which conforms to luminance level, from color-correction suppression values of the highlight and shadow points decided based upon the hue angle; and
correcting the image based upon the suppression value that has been set.

5. The method according to claim 4, wherein the suppression value is set in a direction that suppresses the correction in relation to the hue of a warm color system.

6. An image processing method comprising the steps of:
detecting highlight and shadow points based upon a histogram of an image;
acquiring a hue angle in the direction of the slope of an axis connecting the shadow point and highlight point;
setting a color-correction suppression value, which conforms to luminance level, from color-correction suppression values of the highlight and shadow points and of halftone levels decided based upon the hue angle; and
correcting the image based upon the suppression value that has been set.

7. The method according to claim 6, wherein the suppression value is set in a direction that suppresses the correction in relation to the hue of a warm color system.

8. A computer program product storing a computer-readable medium comprising computer program code for an image processing method, said method comprising the steps of:
detecting highlight and shadow points based upon a histogram of an image;
acquiring a hue angle from average color difference information of image data having luminance levels of the highlight and shadow points;
revising color information of the highlight and shadow points by adjusting the average color difference information based upon the hue angle; and
correcting the image based upon the revised color information of the highlight and shadow points.

9. A computer program product storing a computer-readable medium comprising computer program code for an image processing method, said method comprising the steps of:
detecting highlight and shadow points based upon a histogram of an image;
acquiring a hue angle from average color difference information of image data having luminance levels of the highlight and shadow points;
setting a color-correction suppression value, which conforms to luminance level, from color-correction suppression values of the highlight and shadow points decided based upon the hue angle; and
correcting the image based upon the suppression value that has been set.

10. A computer program product storing a computer-readable medium comprising computer program code for an image processing method, said method comprising the steps of:
detecting highlight and shadow points based upon a histogram of an image;
acquiring a hue angle in the direction of the slope of an axis connecting the shadow point and highlight point;
setting a color-correction suppression value, which conforms to luminance level, from color-correction suppression values of the highlight and shadow points and of halftone levels decided based upon the hue angle; and
correcting the image based upon the suppression value that has been set.

11. An image processing apparatus comprising:
a detector, arranged to detect highlight and shadow points based upon a histogram of an image;
an acquisition section, arranged to acquire a hue angle from average color difference information of image data having luminance levels of the highlight and shadow points;
a revision section, arranged to revise color information of the highlight and shadow points by adjusting the average color difference information based upon the hue angle; and
a corrector, arranged to correct the image based upon the revised color information of the highlight and shadow points.

12. An image processing apparatus comprising:
a detector, arranged to detect highlight and shadow points based upon a histogram of an image;
an acquisition section, arranged to acquire a hue angle from average color difference information of image data having luminance levels of the highlight and shadow points;
a setting section, arranged to set a color-correction suppression value, which conforms to luminance level, from color-correction suppression values of the highlight and shadow points decided based upon the hue angle; and
a corrector, arranged to correct the image based upon the suppression value that has been set.

13. An image processing apparatus comprising:
a detector, arranged to detect highlight and shadow points based upon a histogram of an image;

an acquisition section, arranged to acquire a hue angle in the direction of the slope of an axis connecting the shadow point and highlight point;

a setting section, arranged to set a color-correction suppression value, which conforms to luminance level, from color-correction suppression values of the highlight and shadow points and of halftone levels decided based upon the hue angle; and a corrector, arranged to correct the image based upon the suppression value that has been set.

* * * * *